Aug. 22, 1933.    P. C. TEMPLE    1,923,595
CONTROL MECHANISM
Filed May 14, 1930    2 Sheets-Sheet 1
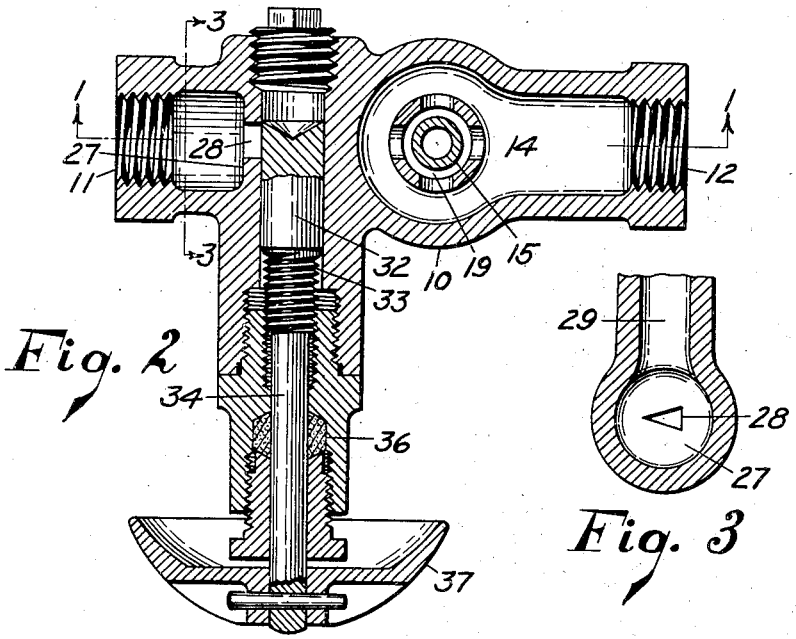
Fig. 2
Fig. 3
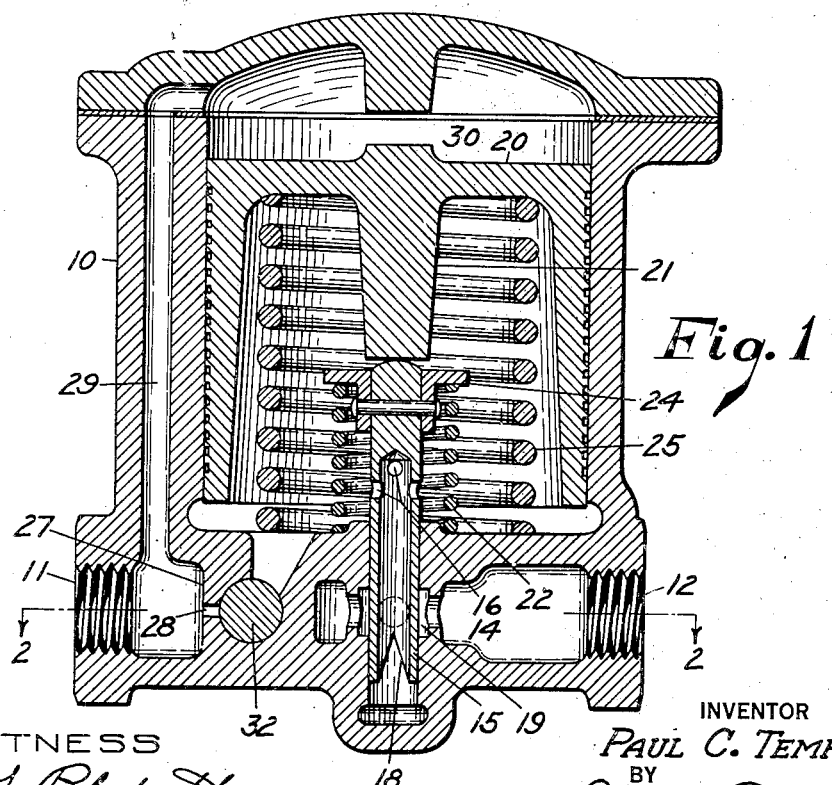
Fig. 1
WITNESS
A. G. Blodgett
INVENTOR
PAUL C. TEMPLE
BY
Clayton R. Jenks
ATTORNEY Aug. 22, 1933.  P. C. TEMPLE  1,923,595
CONTROL MECHANISM
Filed May 14, 1930  2 Sheets-Sheet 2

WITNESS
A. G. Blodgett

INVENTOR
PAUL C. TEMPLE
BY
Clayton R. Jenks
ATTORNEY

Patented Aug. 22, 1933

1,923,595

UNITED STATES PATENT OFFICE 1,923,595

CONTROL MECHANISM

Paul C. Temple, Decatur, Ill., assignor to A. W. Cash Company, Decatur, Ill., a Corporation of Delaware Application May 14, 1930. Serial No. 452,434

4 Claims. (Cl. 137—152.5)

This invention relates to control mechanisms, and more particularly to a fluid flow control mechanism which may be used in connection with a fluid operated motor to automatically maintain a constant and preferably adjustable speed regardless of variations in pressure or resistance.

In the construction of various types of apparatus, such as machine tools for example, it is frequently found desirable to utilize fluid pressure motors for the operation of the different parts. It is often important to move such parts at a uniform speed, but this result may be difficult to obtain with prior arrangements, where the pressure of the operating fluid and the resistance to movement are likely to vary within wide limits. Either an increase in the operating pressure or a decrease in the resistance tends to cause an undesirable increase in the speed and thus impair the uniformity of the product.

It is accordingly one object of my invention to provide a fluid flow control mechanism which will automatically maintain the speed of a power actuated motor constant, and which will be particularly useful in connection with a fluid operated motor subject to a variable operating pressure or resistance.

It is a further object of my invention to provide a fluid flow control mechanism which may be easily and conveniently adjusted to permit the operation of a power actuated motor at different speeds, and which will maintain the speed constant for each position of adjustment.

A further object is to provide a valve mechanism which may be used in connection with various types of apparatus to maintain the rate of flow of a liquid constant though the pressure at either side of the valve may vary within wide limits.

A further object is to provide an automatically actuated valve which will be extremely sensitive to the slightest change in flow, and which will move freely without any tendency to stick against its seat.

With these and other objects in view, as will be apparent to those skilled in the art, my invention resides in the combination of parts set forth in the specification and covered by the claims appended hereto.

In accordance with my invention I provide a casing having an inlet and an outlet, and a valve to control the flow through the casing. The valve is actuated by a spring loaded piston slidable within the casing and subjected to a pressure differential produced by an orifice through which the fluid must flow. The orifice is preferably adjustable in size, and the valve is preferably separate from the piston and held in contact therewith by a second spring.

Referring to the drawings illustrating one embodiment of my invention, and in which like reference numerals indicate like parts, Fig. 1 is a cross section on the line 1—1 of Fig. 2;

Fig. 2 is a cross section on the line 2—2 of Fig. 1;

Fig. 3 is a cross section on the line 3—3 of Fig. 2, certain parts being broken away;

Figures 4, 5:
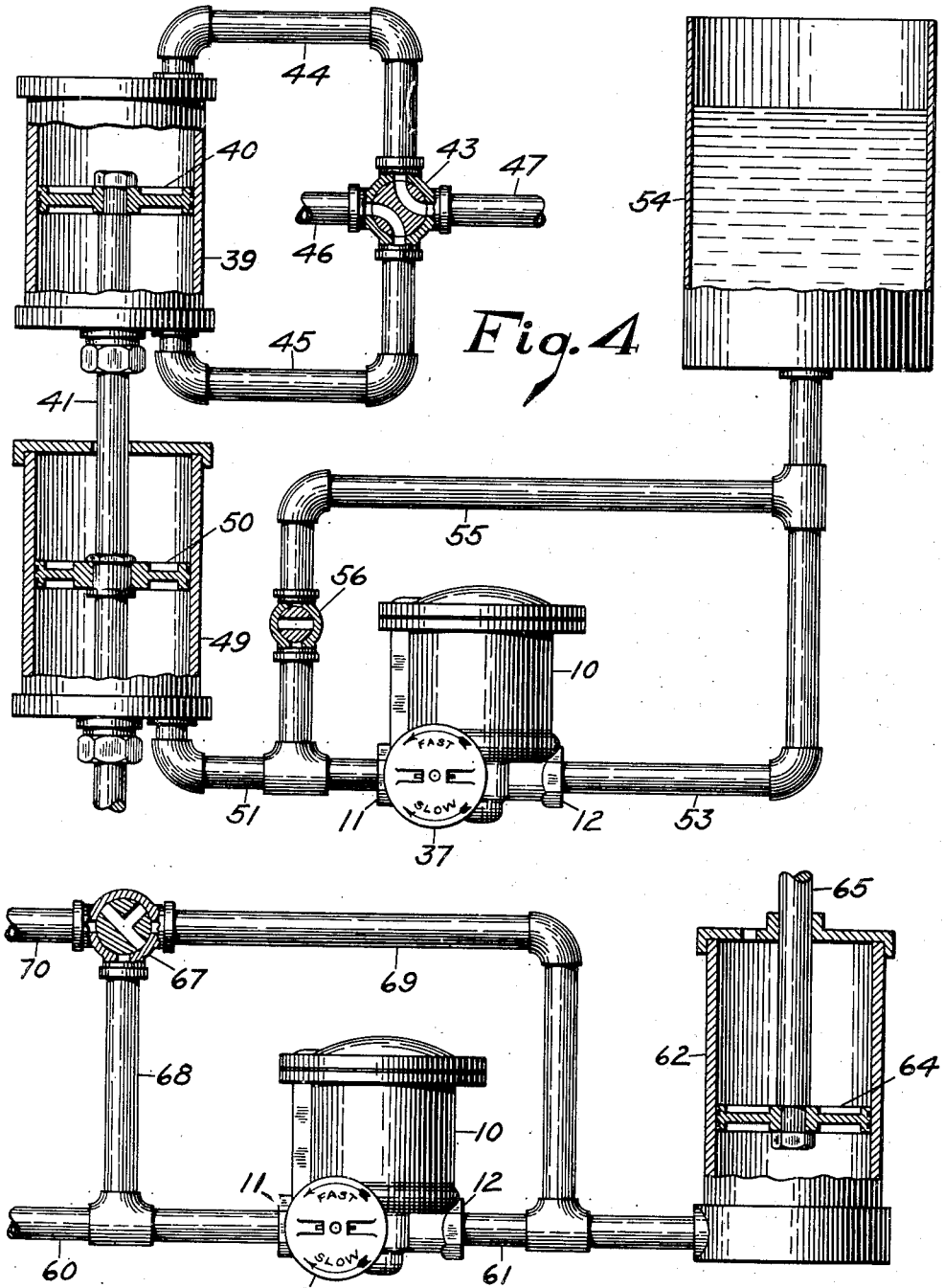
Fig. 4 is an elevation showing the automatic valve connected to a fluid operated motor, certain parts being shown in section for clearness of illustration.
Fig. 5 is a view similar to Fig. 4 showing a modified form of the invention.

The embodiment of the invention illustrated in the drawings comprises a casing 10 having an inlet opening 11 and an outlet or discharge opening 12. These openings 11 and 12 may be screw-threaded as shown to facilitate the connection of pipes thereto. A conduit 14 leads from the inlet to the outlet, and the flow of liquid in this conduit is controlled by a valve 15, which is preferably so constructed as to be perfectly balanced and free from all tendency to stick or bind. As illustrated this valve may be formed as a hollow cylindrical sleeve slidable vertically in the casing. The valve is provided with ports 16 in its upper portion which lead the liquid to the interior of the valve, and with opposed discharge ports 18 in its wall at its lower end which are preferably V-shaped as shown to give the desired characteristics of operation and prevent wire drawing of the liquid. An annular port 19 in the casing surrounds the sleeve 15 and is arranged to register with the V-shaped ports 18. The casing fits the valve closely both above and below the port 19 and provides a slide way for the valve. With this construction the valve will be opened with an upward movement and closed by a downward movement. As a result of the symmetrical construction of the valve and arrangement of its ports, it will be perfectly balanced under the fluid pressure, and there will be no tendency for it to stick and cause erratic operation.

In order that the valve may be actuated automatically to maintain a constant rate of flow in the conduit 14, I provide a fluid pressure actuated piston 20 slidable in the casing 10. This piston is preferably arranged above the valve 15 and co-axial therewith. While the piston and valve may be formed integral with each other, I prefer to form them of separate parts as illustrated. This permits each part to be made of the most suitable material and avoids a serious problem in alignment. A projection 21 extends downwardly from the central portion of the piston to the upper end of the valve. The valve is held against this projection by a compression spring 22 which bears against a flange 24 riveted to the valve. A second spring 25, larger in diameter than spring 22, is located beneath the piston. It will be noted that the effect of these two springs is to bias the valve toward open position. The contacting surfaces of the valve and piston are shaped to allow relative movement between these parts in a direction transverse to the sliding movement of the valve, so that even though the valve and piston are out of alignment, the piston cannot transmit lateral stresses to the valve and cause it to bind against the wall of its slide way. In the embodiment illustrated, the projection 21 is shown with a plane horizontal surface which contacts with a convex surface on the upper end of valve 15.

In order to obtain a pressure difference for the operation of the piston 20, I provide a partition 27 which extends across the conduit between the inlet and the outlet, and which has an orifice 28 therein. The liquid in flowing through the orifice is reduced in pressure, the pressure difference being a function of the rate of flow. It will be clear from Fig. 1 that the reduced pressure posterior to the orifice is effective against the lower side of the piston. The pressure at the inlet anterior to the orifice is conducted through a passageway 29 in the casing which leads to the chamber 30 above the piston. It will now be seen that the liquid pressure difference due to the throttling effect of the orifice tends to move the piston downwardly and close the valve, and that this tendency is opposed by the force of the springs. Whenever the rate of flow increases to a point slightly above the value for which the mechanism is set, the pressure drop across the orifice will likewise increase, the piston will move downwardly and close the valve, and normal flow will be restored. If the flow decreases below normal, the pressure drop will decrease, the springs will move the piston upwardly, and the valve will open, thus bringing the rate of flow back to the desired value. The piston and valve float at all times in a proper position to maintain the desired flow, the liquid pressure difference on the two sides of the piston being exactly balanced by the springs.

I preferably provide means for adjusting the valve mechanism so as to permit a variation in the rate of flow which it will maintain. This may be conveniently accomplished by providing manually operated means for altering the size of the orifice 28, and the preferred construction comprises a cylindrical valve 32 arranged to be moved axially so as to obstruct the orifice to a greater or lesser degree. Improved characteristics are obtained by forming the orifice in the shape of a V as shown in Fig. 3. The valve 32 is provided with a screw-threaded portion 33 and a stem 34. The stem extends through a stuffing box 36 and carries a handwheel 37 on its outer end. By turning the handwheel the valve is moved axially to vary the orifice size. The smaller the orifice size, the greater the pressure drop for a given rate of flow, and hence a lower rate of flow will provide the necessary pressure drop to balance the force of the springs.

While the flow controlling valve mechanism so far described is useful in various connections, it is particularly effective in controlling the speed of motors such as fluid pressure operated motors. One such construction is disclosed in Fig. 4. The motor the speed of which is to be controlled comprises a cylinder 39, a piston 40 slidable in the cylinder, and a piston rod 41 fastened to the piston. A four-way valve 43 is connected to a pipe 44 leading to the upper end of the cylinder, a pipe 45 leading to the lower end of the cylinder, to an exhaust pipe 46, and to a supply pipe 47 leading from any suitable supply of fluid under pressure, such as compressed air. This air of course must be at a sufficiently high pressure to overcome any resistance encountered by the piston rod. When the valve 43 is in the position shown, air will flow from supply pipe 47 through pipe 44 to the upper end of the cylinder, forcing the piston 40 to move downwardly. At the same time the air in the lower end of the cylinder will pass through pipe 45 to the exhaust pipe 46. If the valve 43 is turned through 90 degrees in either direction, the lower end of the cylinder will be connected to the supply and the upper end to the exhaust, thus causing upward movement of the piston. The piston rod 41 extends downwardly and is connected to the apparatus (not shown) which is to be operated.

In order to maintain the speed of the piston 40 constant during its downward working stroke, regardless of variations in the air pressure or in the resistance to movement, I preferably provide a second cylinder 49 in line with the cylinder 39. The piston rod 41 passes through the cylinder 49 and carries a second piston 50 which is slidable therein. The lower end of cylinder 49 is connected by a pipe 51 to the inlet 11 of casing 10 of the flow controller, and the outlet 12 of the casing is connected by a pipe 53 to an elevated tank or reservoir 54 containing a suitable liquid, such as oil. A pipe 55 provided with a valve 56 leads from pipe 51 to pipe 53 and serves as a by-pass conduit around the flow control mechanisms.

The operation of the embodiment illustrated in Fig. 4 is as follows. Assume the pistons 40 and 50 are at the top of their respective cylinders and the lower end of cylinder 49 is filled with oil. With valve 56 closed and valve 43 in the position shown, compressed air will enter the upper end of cylinder 39, causing the pistons to move downwardly and forcing oil out of cylinder 49 through the flow controller and back to the tank 54. The flow controller will automatically maintain a constant rate of flow, as heretofore explained, regardless of variations in the air pressure or in the resistance encountered by piston rod 41 in doing the work for which it is arranged. Of course such variations may cause great changes in the pressure of the oil in cylinder 49, but this cannot affect the flow. Since oil is practically incompressible, the speed of the motor will be directly proportional to the rate of flow, and hence will be kept constant as desired, even though the load should suddenly be entirely removed from the piston rod. For rapid return movement of the pistons upwardly, valve 56 is opened and valve 43 turned through 90 degrees. Oil will then flow from the reservoir 54 through pipe 55, by-passing the controller, and permitting cylinder 49 to fill quickly.

By proper manipulation of valve 56, the downward movement may be rapid up to any desired point. As soon as valve 56 is closed, the flow controller will become effective and a desired constant speed maintained.

In Fig. 5 I have illustrated a modified form of the invention. A suitable liquid, such as oil, is supplied under pressure to the inlet 11 of the flow controller through a pipe 60. A pipe 61 leads from the outlet 12 to the lower end of a vertical cylinder 62 of a hydraulic motor having a slidable piston 64. A piston rod 65 extends upwardly from the piston 64 and connects with the apparatus (not shown) which is to be driven. It will be seen that this motor is single acting, the upward working stroke being under power, and the downward return stroke by gravity. A three-way valve 67 is connected by a pipe 68 to pipe 60, by a pipe 69 to pipe 61, and by a pipe 70 to exhaust.

The operation of this arrangement is as follows: With valve 67 in the no-flow position as shown, oil will flow from supply pipe 60 through the controller and pipe 61 to the cylinder 62, thus raising the piston 64. This upward movement will be at a uniform speed regardless of variations in resistance, since the controller will automatically maintain a constant rate of flow. For rapid upward movement, the valve 67 will be turned from the position shown through 45 degrees in a clockwise direction. This will permit oil to flow from supply pipe 60, through pipes 68 and 69 through the controller and thus to the cylinder 62. For rapid downward movement of the piston, valve 67 will be turned from the position illustrated through an angle of 45 degrees in a counter-clockwise direction, thus permitting the oil in cylinder 62 to flow freely to the exhaust 70 through pipe 69. The speed of the working stroke can be easily and conveniently varied by adjusting the handwheel 37. The great practical advantages of the construction, particularly in connection with machine tool operation, will be readily appreciated by those skilled in the art.

Certain features of the invention relating to the control of motor speeds are disclosed in a divisional application, Serial No. 634,873, filed September 26, 1932.

Having thus described my invention, what I claim as new and desire to secure by Letters Patent is:

1. A fluid flow control mechanism comprising a casing having an inlet and an outlet, a valve slidably mounted in the casing to control the rate of flow therethrough, a partition in the casing between the inlet and the outlet and provided with an orifice, a piston slidably mounted in the casing which contacts with and is arranged to move the valve, said piston being subjected to the fluid pressure drop across the orifice, a spring arranged to oppose movement of the piston in response to an increase in said fluid pressure drop, and a second spring arranged to hold the valve in contact with the piston for actuation thereby.

2. A fluid flow control mechanism comprising a casing having an inlet and an outlet, a valve slidably mounted in the casing to control the rate of flow through the outlet, a partition in the casing between the inlet and the valve and provided with an orifice, a piston slidably mounted in the casing which contacts with and is arranged to move the valve, said piston being subjected to the fluid pressure drop across the orifice, a spring arranged to oppose movement of the piston in response to an increase in said fluid pressure drop, and a second spring arranged to hold the valve in contact with the piston for actuation thereby.

3. A fluid flow control mechanism comprising a casing shaped as a chamber having a restricted inlet orifice communicating with a fluid supply and an outlet, a balanced valve shaped as a hollow cylindrical sleeve through which the fluid flows and arranged to slide axially to control the rate of flow through the outlet, a piston slidably mounted in the casing coaxially with the slidable valve and contacting therewith, means for subjecting the piston on one side to the fluid pressure anterior to the orifice, the other side being under the fluid pressure within the casing, a spring arranged to oppose movement of the piston in response to an increase in the anterior fluid pressure on the piston, and a second spring arranged to hold the slidable valve in contact with the piston for actuation thereby, whereby the piston automatically actuates the valve to maintain a constant flow of fluid under variable fluid pressure conditions.

4. A fluid flow control mechanism comprising a casing shaped as a chamber having a restricted inlet orifice communicating with a fluid supply and an outlet, a balanced valve shaped as a hollow cylindrical sleeve through which the fluid flows and arranged to slide axially to control the rate of flow through the outlet, an adjustable valve to vary the size of the inlet orifice, a piston slidably mounted in the casing coaxially with the slidable valve and contacting therewith, means for subjecting the piston on one side to the fluid pressure anterior to the orifice, the other side being under the fluid pressure within the casing, a spring arranged to oppose movement of the piston in response to an increase in the anterior fluid pressure on the piston, and a second spring arranged to hold the slidable valve in contact with the piston for actuation thereby, whereby the piston automatically actuates the valve to maintain a constant flow of fluid under variable fluid pressure conditions.

PAUL C. TEMPLE.